March 20, 1945.  A. KUHNS ET AL  2,371,828
REVERSE GEAR
Filed June 14, 1943
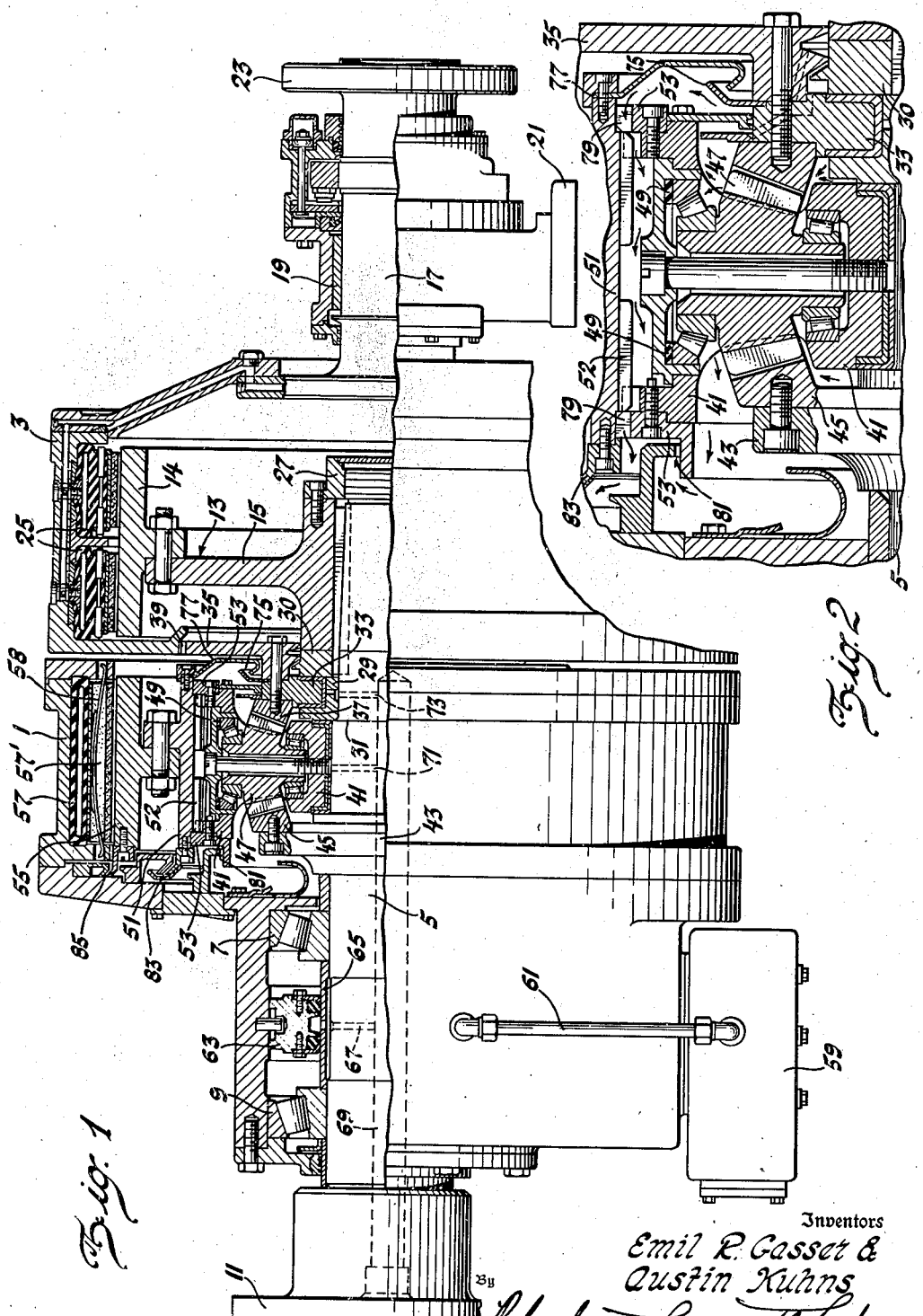
Inventors
Emil R. Gasser &
Austin Kuhns
By
Blackmor, Spencer & Flint
Attorneys Patented Mar. 20, 1945

2,371,828

UNITED STATES PATENT OFFICE 2,371,828

REVERSE GEAR

Austin Kuhns and Emil R. Gasser, Buffalo, N. Y., assignors to General Motors Corporation, Detroit, Mich., a corporation of Delaware Application June 14, 1943, Serial No. 490,742

5 Claims. (Cl. 74—297)

The present invention generally relates to reversing gears and more particularly relates to marine reversing gears of the planetary type.

The principal object of the present invention is to provide an improved arrangement of the elements of a marine reversing gear of the planetary type in order to reduce the size of the unit.

Another object is to provide suitable means for supporting the planetary gearing and shafts, whereby self-alignment of these parts and equalization of the stress between the planet pinions is obtained and to prevent chattering of the gearing.

Another object is to provide adequate lubrication and cooling of the reversing gear elements to permit frequent reversal thereof.

Another object is to provide a driven shaft supporting a bearing in the reversing gear unit which also acts as a propeller thrust bearing.

The improved arrangement of the elements comprising the present reversing gear assembly by which the above objects are accomplished, together with other novel features thereof, will become apparent by reference to the following detailed description and accompanying drawing illustrating a reversing gear unit which is particularly adapted for marine use.

Figure 1 of the drawing shows a side elevation of the reversing gear unit with certain of the parts broken away and others in section in order to better illustrate the invention.

Figure 2 of the drawing is an enlarged detail view to better illustrate the path of oil flow to the various elements of the gear.

The reversing gear unit generally comprises a stationary housing 1 and a driving clutch housing 3 of hollow cylindrical form, located immediately adjacent the housing 1. The stationary housing 1 includes the planetary reversing gearing, a reaction brake for the planetary cage member and a driven shaft 5 which is supported on a pair of axially spaced tapered roller bearings 7 and 9 located in the rear portion of the housing 1. These bearings 7 and 9 are capable of taking the full thrust of a propeller shaft, not shown, which is adapted to be directly connected to a shaft coupling 11 secured on the rear end of the driven shaft 5. The cylindrical driving clutch housing includes a clutch driven member, shown generally at 13, comprising a clutch drum 14 and a hub 15 secured thereto. The hub 15 is keyed on the forward portion of the driven shaft 5. The forward end wall of the clutch housing 3 is secured on the rear end of a driving shaft 17 which is supported in a bearing 19 of a stationary pedestal 21 for rotation about an axis coaxial with that of the driven shaft. A flange 23 is secured on the forward end of the driving shaft 17 and the prime mover main shaft, not shown, is adapted to be connected directly to this flange. The bearing 19 supporting the driving shaft is of the sleeve type to permit slight axial movement of the prime mover main shaft and driving shaft 17.

Engagement or disengagement of the driving clutch is accomplished by two inflatable annular tires 25 which are secured to the inner cylindrical surface of the clutch housing 3. The interior of these tires are connected by suitable air passages provided in the forward end wall of the clutch housing and the driving shaft to an air seal of a well known type which is located in the bearing pedestal 21 so that the tires may be inflated or deflated to cause engagement or disengagement of the internal frictional surfaces provided on the clutch tires with the clutch driven member 13 of the clutch.

A nut 27 is threaded on the forward end of the driven shaft 5 to urge the hub 15 into contact with a flanged sleeve 29 and a collar 30 located on the driven shaft between the hub 15 and a shoulder 31 on the driven shaft to cause the sleeve and collar to rotate with the driven shaft. A bearing member 33 is confined between the flanged sleeve and collar and is rotatable with respect thereto as sufficient clearance is provided to permit slight axial and radial movement of the bearing member with respect to the sleeve and collar. The bearing member 33 has a driving flange 35 and a bevel sun gear 37 secured thereto. The driving flange is provided with teeth 39 which engage teeth formed in an opening in the rear end wall of the clutch housing 3 to permit slight relative axial and radial movement between these parts.

A planet cage member 41 is rotatably mounted on the driven shaft 5 between the sleeve 29 and a flange 43 on the driven shaft and clearance is also provided between the shaft and cage to permit slight axial and radial movement of the cage with respect to the shaft. A bevel sun gear 45 is secured on the flange 43 of the driven shaft and a plurality of bevel planet pinions 47 are rotatably supported in the cage for rotation about an axes at right angles to the shaft 5 on tapered roller bearings, shown located on opposite sides of these pinions in order to retain the pinions in proper mesh with the bevel sun gears 37 and 45. A resilient washer 49 is placed between the outer support bearing of each pinion and the cage 41 to resiliently oppose outward radial movement of the pinions with respect to the cage and to damp out radial oscillations of the pinions. A reaction brake supporting ring 51 is provided with teeth 52 on the inner surface thereof and these teeth loosely engage grooves provided in the outer edges of the cage member 41 to permit slight radial movement and axial movement between these members. Side retaining rings 53 are secured on the cage member to limit the radial movement of the teeth 52 of the brake support ring with respect to the cage. A brake drum 55 is secured to an external flange on the supporting ring 51 and an inflatable brake tire 57 of annular form is secured to the internal cylindrical surface of the stationary housing in concentric relation with the brake drum. The brake tire 57 has a plurality of brake blocks 57' secured on the internal surface thereof for engagement with the brake drum 55 upon inflation of the tire. These blocks 57' have openings extending axially therethrough in which leaf springs 58 are located. The ends of these springs 58 are shown in contact with recesses in the stationary housing and the center portion of the springs exert outward radial force on the tire and blocks to normally prevent engagement of the blocks with the brake drum 55. Inflation and deflation of the brake tire is accomplished by means of pipe connections and a valve, not shown, which are connected to the brake tire.

A lubricating and cooling pump, not shown, is included in the lower portion of the stationary housing in a pump housing, shown at 59. This pump is driven by means of suitable gears and shafts, not shown, which are operably connected to the driven shaft 5. The pump draws oil from the lower portion of the pump housing 59 and supplies oil under pressure by means of a pipe 61 to an oil groove provided in an oil distributing ring 63 which encircles the driven shaft 5 and is secured in the housing 1 between the bearings 7 and 9. A sleeve 65 is rotatable in the ring and is clamped between the inner races of the bearings 7 and 9 and suitable seals are provided between the ring and sleeve to prevent leakage of oil from the oil groove of the ring. The sleeve 65 is provided with radial openings which permits oil to pass radially inwardly from the ring groove to an external groove in the driven shaft 5 under the sleeve and a radial shaft passage 67 extends from this shaft groove to an axial shaft passage 69. A radial shaft passage 71 extends from the axial shaft passage 69 to an annular groove provided in the internal cylindrical bearing surface of the cage member 41 and another radial shaft passage 73 also extends from the shaft passage 69 to the internal cylindrical surface of the flanged sleeve 29 which is provided with radial oil holes to permit oil to pass to the internal cylindrical surface of the bearing member 33 supported for rotation on the flanged sleeve 29 between the flange thereon and the collar 30 adjacent the sleeve. It will be evident that oil under pressure will be supplied to the internal cylindrical bearing surfaces of both the cage member 41 and the bearing member 33 by means of these passages.

As best shown in Figure 2 the oil is forced axially outwardly of these bearing surfaces and radially outwardly along the radial bearing surface of the cage 41 and bearing member, and is then thrown by centrifugal force in the direction of the arrows on to the faces of the sun gears 37 and 45 and planet pinions 47 and bearings supporting these pinions. An oil throw off ring 75 is secured to the bearing member 33 and a baffle ring 77 is secured on the brake drum supporting ring 51 so that it rotates adjacent the throw of ring 77. The rings 75 and 77 are shaped so that the oil thrown outwardly from the bearing member 33 and cage member 41 cannot be thrown on the right edge of the brake drum 55 and is caused to flow to the left, in the direction of the arrows, through grooves 79 in the retaining rings 53 and along the teeth 52 on the internal surface of the brake drum supporting ring 51 to cool it and the brake drum 55. The teeth 52 on the ring 51, therefore, serve as cooling fins as well as one element of the lost motion driving connection between the cage member 41 and the brake drum supporting ring 51. In order to prevent oil from being thrown outwardly on to the left edge of the brake drum 55 a plurality of sets of stationary and rotatable ring shaped baffles, indicated generally at 81, 83 and 85 in Figure 1, are located in the space between the rear wall of the stationary housing 1 and the left edges of the cage member 41, brake drum supporting ring 51 and the brake drum 55. The fixed baffles are secured to the housing 1 and the rotatable baffles are secured to the rotatable cage, brake drum supporting ring and brake drum and these baffles are so shaped that no oil can reach the left edge of the brake drum 55.

With the elements of the reversing gear mounted and interconnected in the above described manner whereby relative movement is permitted between the reversing gear and shaft elements so that self alignment and equalization of stress between the gear elements takes place when these elements transmit forward or reverse driving torque, and chatter between these elements is prevented by reason of the oil pressure applied to the clearance space between the loosely mounted elements and by the resilient washers 49 provided for allowing radial movement of the planetary pinions 47.

Forward or direct drive through the reversing gear takes place when the driving clutch tires are inflated which causes engagement of the driving clutch housing 3 with the driving clutch driven member 13 secured on the driven shaft 5. Relative axial movement and misalignment between the driving shaft 17 and driven shaft is permitted by the flexible clutch tires 25, the sleeve bearing 19 in the pedestal 21 supporting the driving shaft 19, and also by the lost motion connection between the driving clutch housing 3 and driving flange 35, which, as described, are provided with loosely intermeshing teeth for this purpose. With the driving and driven shafts connected together by engagement of the driving clutch the two bevel sun gears 37 and 45 are rotated at the same speed and the bevel planet pinions 47 meshing therewith will accordingly cause the planetary cage member 41 to also rotate at the same speed. The planetary pinions 47 will accordingly not rotate about their axes but will rotate with the cage 41 as a unit about the axis of the driven shaft 5 and at the same speed as this shaft. Rotation of the driven shaft 5 causes the pump driven thereby, not shown, to supply oil pressure to the clearance space between the cage member 41 and shaft 5 and to the clearance space between the bearing member 33 and the flanged sleeve 29 and collar 30 on the shaft 5 to cushion these parts and prevent chatter of these elements due to the clearance provided. As there is only slight load on the intermeshing teeth of the sun and planet gears when they are rotating as a unit without relative angular movement therebetween, any tendency of the planetary pinions to move radially with respect to the cage is opposed and cushioned by the resilient washers 49 provided between the cage member 41 and the outer supporting bearings of each of the pinions. The above described means for cushioning the gear and gear mounting elements, therefore, effectively prevents chatter and what is referred to as "brinelling" of these parts when no driving torque is transmitted through the gear elements.

Disengagement of the driving clutch elements and engagement of the brake blocks 57 with the brake drum 55 causes the planetary cage 41 member to be stopped by reason of lost motion connection between the cage and brake drum supporting ring comprising the intermeshing grooves and teeth of the cage and ring. The loosely mounted bevel ring gear 37 accordingly becomes the driver, the planetary bevel pinions 47 and cage 41 becomes the reaction members and the bevel sun gear 47, secured to the driven shaft, becomes the driven member to cause the driven shaft to be rotated in the opposite direction to that of the driving shaft 17. The driving and reaction torque loads applied to the gear elements causes the loosely mounted gear elements to automatically align themselves both axially and radially so that equal stress is applied to the planetary pinions. Any relative movement between the gear elements is likewise cushioned by the oil pressure applied to the clearance spaces between supporting bearing surfaces thereof and by the resilient washers 49 opposing radially outwardly movement of the pinions 47. It will be evident that relative axial and radial movement between the cage 41 and brake drum supporting ring 51 is permitted by the lost motion connection comprising the teeth 52 in the ring 51 which mesh with the grooves in the cage member and relative axial and radial movement between the brake drum 55 and housing 1 is permitted by the flexible brake tire 57. Relative axial and radial movement between the shafts 5 and 17 and between the shaft 5 and bearing member 33 supporting the sun gear 37 is permitted by the previously mentioned lost motion connection between the driving flange 35 and driving clutch housing 3.

The above described mounting arrangement of the elements and the manner of loosely supporting certain of the gear elements to permit self alignment thereof and equalization of stress therebetween, and the cooling and cushioning thereof by oil pressure and resilient means, together with the means permitting relative movement and misalignment between the driving and driven shafts, has been found to provide a satisfactory operation on vessels where frequent reversal is required and to require less space than conventional reversing gears of similar capacity.

We claim:

1. A reversing gear comprising a pair of aligned bearings, a driving shaft rotatably supported in one of said bearings, a driven shaft rotatably supported in the other bearing, a clutch housing secured to said driving shaft, a clutch driven member secured to said driven shaft and located within said clutch housing, flexible and expansible means between said clutch housing and clutch driven member to cause clutch engagement and to permit misalignment between said clutch housing and said clutch driven member, a stationary brake housing, planetary gearing and braking means located in said brake housing and supported on said driven shaft, said gearing including a pair of sun gears, a planetary cage member and planetary pinions loosely supported for rotation in said cage, one of said gears being rigidly secured to said driven shaft and said other gear being loosely mounted on said driven shaft to permit self alignment of said loosely mounted gear and said pinions with said rigidly mounted gear, a lost motion driving connection between said clutch housing and said loosely mounted gear to permit self alignment of said gear, a brake drum loosely connected to said cage member to permit alignment of said cage member and flexible and expansible means between said brake drum and said stationary housing to stop said cage member in order to cause reversal of drive between said driving and driven shafts.

2. A reversing gear comprising a stationary gear housing, a rotatable clutch housing adjacent the gear housing, a thrust bearing in said gear housing, a driven shaft rotatably supported in said bearing, a bearing sleeve in axial alignment with said thrust bearing, a driving shaft rotatably supported for axial movement therein, a clutch driven member and planetary reverse gearing supported on said shaft, said gearing comprising a planetary cage member including planetary pinions rotatably supported therein, a brake drum loosely connected to said cage member, and a pair of sun gears meshing with said planetary pinions, one of said sun gears being secured to said shaft and said other sun gear and cage being mounted for slight radial and axial movement on said shaft to permit self alignment of said gear elements, said clutch driven member being located in said clutch housing, and secured to said driven shaft, a lost motion driving connection between said clutch housing and said loosely mounted sun gear on said driven shaft, inflatable resilient means located between said clutch housing and driven member for causing driving engagement therebetween to cause direct drive of said driven shaft by said driving shaft and inflatable resilient means located between and engageable with said brake drum and stationary housing to prevent rotation of said planetary cage member to permit reverse drive of said driven shaft by said driving shaft.

3. A marine reversing gear comprising a stationary gear housing including a thrust bearing, a driven shaft rotatably supported therein, a clutch driven member secured on said driven shaft and planetary reversing gearing included in said housing and supported on said driven shaft, said planetary gearing comprising a cage member loosely mounted on said shaft and including a plurality of bevel pinions supported for rotation about axes extending radially with respect to said shaft axes and resilient means permitting limited radial outward movement of said pinions, a brake drum loosely secured to said cage, and resilient inflatable means engageable with said housing and said drum to prevent rotation of said cage member, a pair of bevel sun gears meshing with said planetary pinions, one of said gears being secured on said shaft and the other of said gears being loosely mounted on said shaft, a bearing sleeve in axial alignment with said driven shaft, a driving shaft rotatably supported in said sleeve, a clutch driving housing secured on said driving shaft adjacent said stationary housing and enclosing said clutch driven member, a lost motion connection between said clutch housing and said loosely mounted sun gear, and inflatable flexible means engageable with said clutch driving housing and driven member to connect said driving shaft to said driving shaft through said planetary reversing gearing.

4. A marine reversing gear comprising aligned driving and driven shafts in spaced end to end relation, a clutch housing secured to said driving shaft, a clutch driven drum secured to said driven shaft and included in said clutch housing, planetary gearing supported on said driven shaft comprising a sun gear secured to said driven shaft, a sun gear rotatably supported on said driven shaft and loosely connected to said clutch housing for rotation thereby, a planetary cage member loosely mounted on said driven shaft, a plurality of planetary pinions loosely mounted in said cage and meshing with said sun gears, means for cushioning movement of said planetary pinions with respect to said cage, an annular brake drum surrounding said cage and loosely connected thereto, a stationary housing for said brake drum and planetary gearing, and flexible pressure distensible annular clutch and brake actuating members positioned respectively between said clutch members and between said brake drum and stationary housing for causing frictional engagement therebetween in order to cause reversal of drive and for permitting misalignment between these members.

5. A reversing gear comprising driving and driven shafts, a bearing for rotatably supporting said driving shaft, a bearing for preventing axial movement and for rotatably supporting said driven shaft in axial alignment with said driven shaft, a clutch housing secured on said driving shaft, a clutch driven member secured to said driven shaft and included in said clutch housing, a bevel sun gear loosely mounted on said driven shaft, a lost motion driving connection between said sun gear and said clutch housing, a second bevel sun gear secured to said driven shaft, a planetary cage member loosely mounted on said driven shaft, said cage member including bevel planetary pinions flexibly mounted therein, a brake drum surrounding said cage member and loosely connected thereto, a stationary braking member surrounding said brake drum, and separate annular flexible members secured to said clutch housing and said stationary housing for respective engagement with said clutch driven member and said brake drum to cause reversal of drive between said driving and driven shafts, said flexible annular members, when expanded, allowing misalignment between said driving and braking members which allows self alignment of the planetary gearing.

AUSTIN KUHNS.
EMIL R. GASSER.